(12) United States Patent
Tanaka

(10) Patent No.: US 9,344,603 B2
(45) Date of Patent: May 17, 2016

(54) IMAGE PROCESSING FOR A MULTI BEAM IMAGE FORMATION

(71) Applicant: CANON KABUSHIKI KAISHA, Tokyo (JP)

(72) Inventor: Yasutomo Tanaka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/337,645

(22) Filed: Jul. 22, 2014

(65) Prior Publication Data

US 2015/0049369 A1  Feb. 19, 2015

(30) Foreign Application Priority Data

Aug. 15, 2013 (JP) .................. 2013-168908

(51) Int. Cl.
*H04N 1/50* (2006.01)

(52) U.S. Cl.
CPC ..................... *H04N 1/508* (2013.01)

(58) Field of Classification Search
CPC ............ H04N 1/4015; H04N 1/00087; H04N 1/0282; H04N 2201/04796; B41J 2/47; G03G 13/04; G03G 15/043; G03G 2215/00599; G02B 26/123

USPC ............... 358/1.4, 1.5, 3.01, 1.18; 399/4; 347/233, 235

See application file for complete search history.

(56) References Cited

U.S. PATENT DOCUMENTS

2011/0122216 A1* 5/2011 Nomura ............... G03G 15/326
347/224

FOREIGN PATENT DOCUMENTS

JP  2004-170755 A  6/2004

* cited by examiner

*Primary Examiner* — Jamares Q Washington
(74) *Attorney, Agent, or Firm* — Fitzpatrick, Cella, Harper & Scinto

(57) ABSTRACT

An image processing apparatus has: an obtaining unit configured to obtain first information used to correct a deviation in an image in a sub scanning direction due to a curve of a scanning line of a first beam and second information used to correct a deviation in an image in the sub scanning direction due to a curve of a scanning line of a second beam; a setting unit configured to set a common position in a main scanning direction to image data of a single color plane for each of the first beam and the second beam based on the obtained first and second information; and a correcting unit configured to shift pixels included in the image data of the single color plane for each of the first beam and the second beam in the sub scanning direction at the set common position.

6 Claims, 14 Drawing Sheets

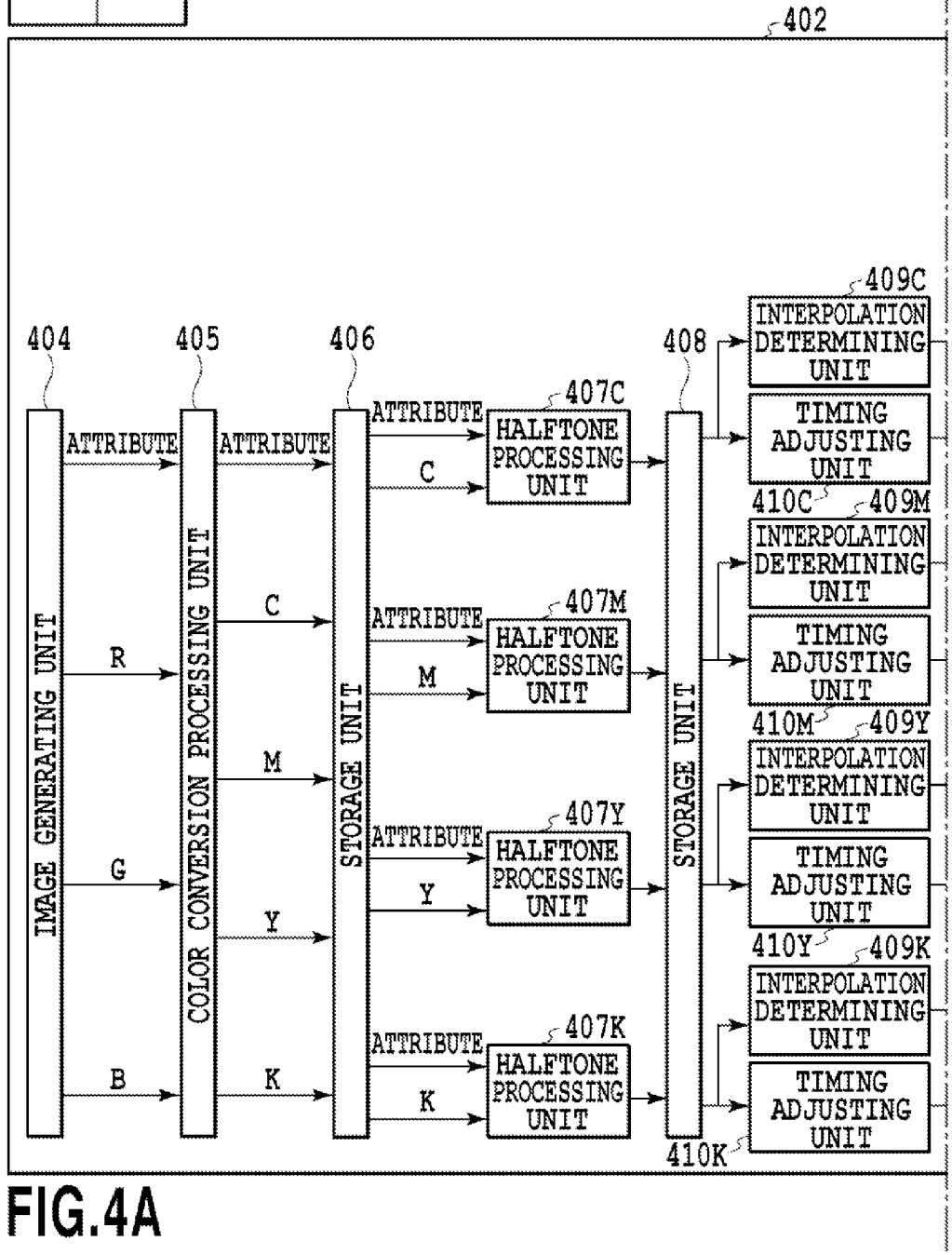

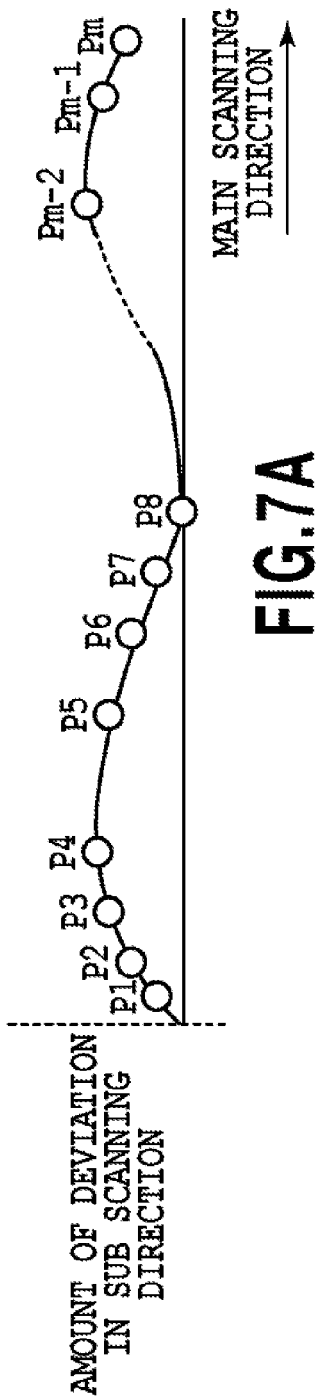
FIG.7A
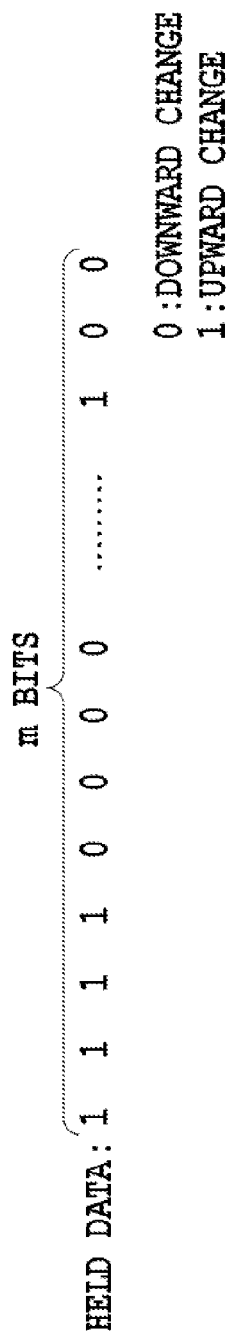
FIG.7B
FIG.7C

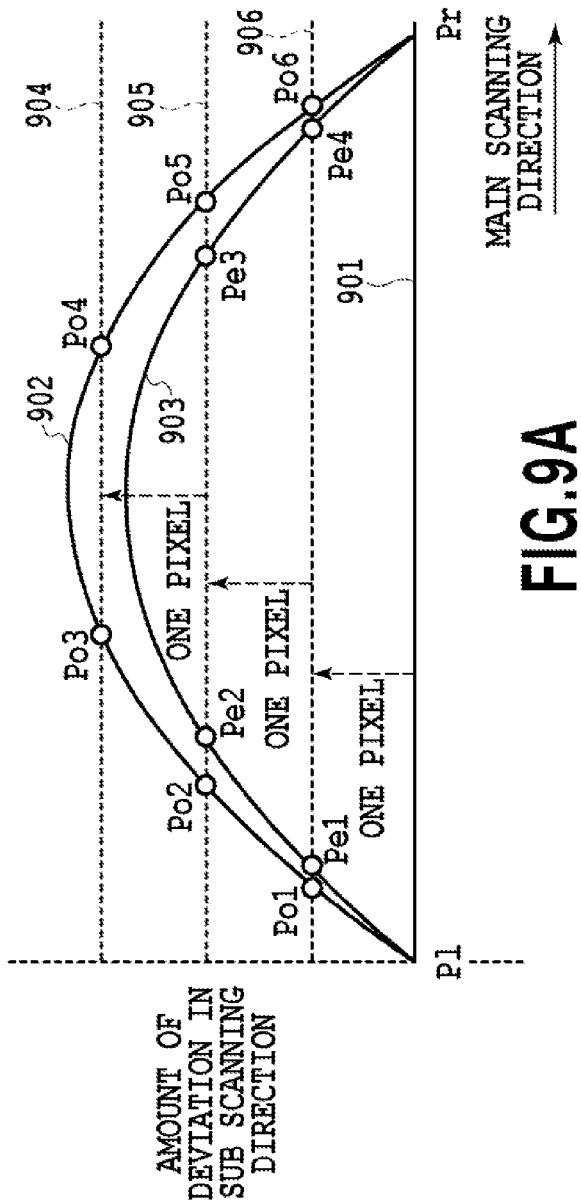
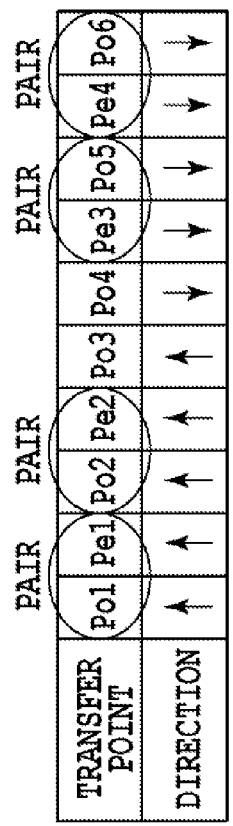
FIG.9A
FIG.9B

IMAGE PROCESSING FOR A MULTI BEAM IMAGE FORMATION

BACKGROUND OF THE INVENTION

1. Field of the Invention

The present invention relates to an image processing apparatus, an image processing method, and a medium.

2. Description of the Related Art

In recent years, the tandem color image forming apparatuses have been increasing in number among the electrophotographic color image forming apparatuses, which comprises developing machines and photoconductor drums in the same number as that of toner colors and sequentially transfer images indifferent colors onto an image conveyance belt or onto a recording medium in order to implement a high speed of image formation. In the tandem color image forming apparatus, it is known that a plurality of factors that cause a deviation in registration exists and various methods for addressing each factor have been proposed.

As the factors that cause a deviation in registration, mention is made of unevenness and a deviation in the attachment position of the lens of the deflection scanning device, a deviation in the position of assembling the deflection scanning device to the main body of the color image forming apparatus, etc. Due to this deviation in position, the scanning line is inclined or curved and the degree of the curve and the direction of the curve of the scanning line differ for each color, and thereby, a deviation in registration is caused. Hereinafter, in the present specification, information on the scanning line, such as the degree and direction of the inclination and curve of the scanning line, is called a "profile".

As a method for addressing a deviation in registration, Japanese Patent Laid-Open No. 2004-170755 describes the method in which the magnitudes of inclination and curve of the beam scanning line are measured by using an optical sensor, bitmap image data is corrected so as to cancel them, and a corrected image thereof is formed. By the method described in Japanese Patent Laid-Open No. 2004-170755, the image data is corrected electrically, and therefore, mechanical adjusting members and adjusting processes at the time of assembly are no longer necessary. Consequently, it is made possible to downsize the color image forming apparatus and at the same time, to address the deviation in registration at a low cost.

In recent years, the image forming apparatuses comprising multiple beams in order to implement a still higher speed of image formation have been increasing in number among the electrophotographic color image forming apparatuses. In this multibeam image forming apparatus, an image of each color plane is formed by using a plurality of beams for a single color plane. For example, in the case of the image forming apparatus for forming an image of each color plane by using two beams for a single color plane, in an image formed for each line in the main scanning direction, a first beam is used for exposure of odd-numbered lines in the sub scanning direction and a second beam is used for exposure of even-numbered lines. Due to this, it is made possible to increase the speed of image formation.

However, in the multibeam image forming apparatus, there is a case where the inclination and curve of the scanning line of each beam for a single color plane differ from beam to beam.

SUMMARY OF THE INVENTION

According to an aspect of the present invention, there is provided an image processing apparatus for processing image data of a single color plane to be transmitted to an image forming unit configured to form an image of the single color plane by a first beam and a second beam. The image processing apparatus has: an obtaining unit configured to obtain first information used to correct a deviation in an image in a sub scanning direction due to a curve of a scanning line of the first beam and second information used to correct a deviation in an image in the sub scanning direction due to a curve of a scanning line of the second beam; a setting unit configured to set a common position in a main scanning direction to the image data of the single color plane for each of the first beam and the second beam based on the obtained first and second information; and a correcting unit configured to shift pixels included in the image data of the single color plane for each of the first beam and the second beam in the sub scanning direction at the set common position.

Further features of the present invention will become apparent from the following description of exemplary embodiments (with reference to the attached drawings).

BRIEF DESCRIPTION OF THE DRAWINGS

FIG. 4 is a diagram showing the relationship of FIGS. 4A and 4B;

FIG. 4A and FIG. 4B are block diagrams for explaining a configuration of each unit related to formation of an electrostatic latent image in the electrophotographic color image forming apparatus;

FIG. 7A to FIG. 7C are diagrams schematically showing the way profile data is held;

FIG. 9A and FIG. 9B are explanatory diagrams for explaining a method for specifying transfer points that make a pair of transfer points of two beams within the same color plane in the multibeam image forming apparatus according to the first embodiment;

DESCRIPTION OF THE EMBODIMENTS

First Embodiment

Hereinafter, a first embodiment is explained by using drawings.

Figure 4B:
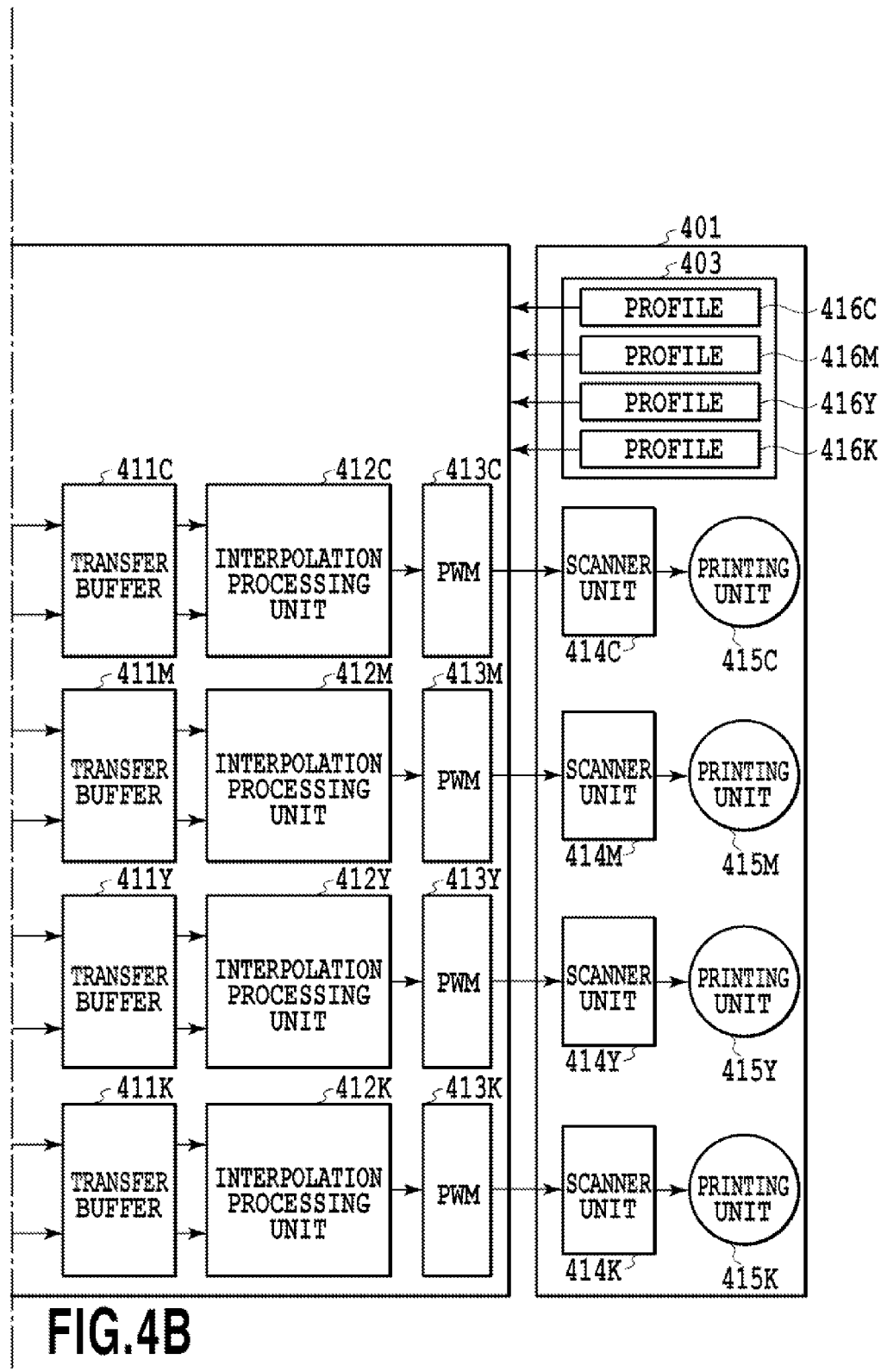

FIG. 4A and FIG. 4B are block diagrams for explaining a configuration of each unit related to creation of an electrostatic latent image in an electrophotographic color image forming apparatus. The color image forming apparatus includes an image forming unit 401 and an image processing unit 402. The image processing unit 402 generates bitmap image information and based on the generated bitmap image information, the image forming unit 401 forms an image on a recording medium. The image forming apparatus has a CPU, ROM, RAM, and HDD, not shown, and these units operate in cooperation in accordance with processing programs stored in the HDD, thereby processing in each processing unit in FIG. 4 is performed.

Figure 2:
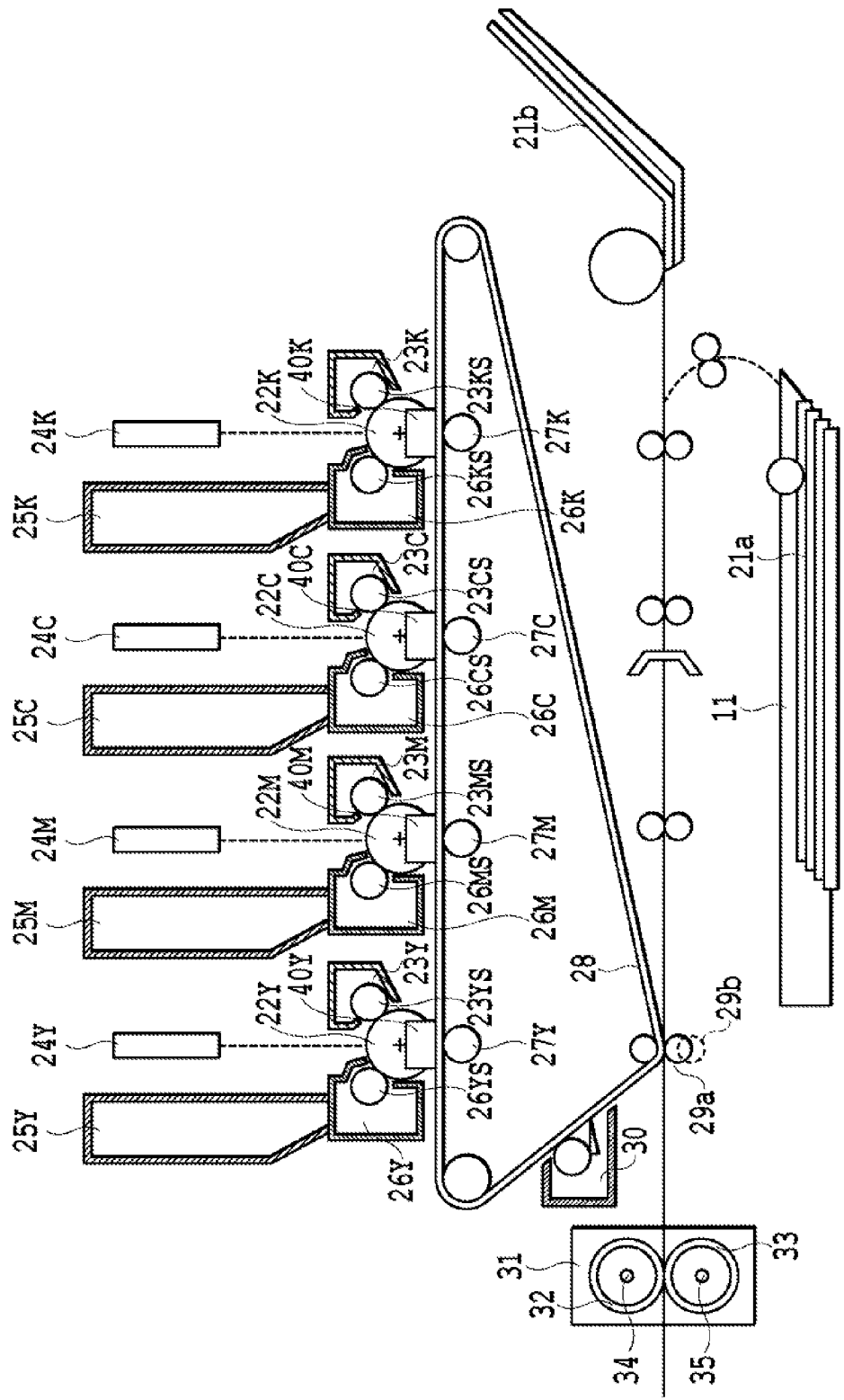
FIG. 2 is a section view of a tandem color image forming apparatus having adopted an intermediate transfer body, which is an example of the electrophotographic color image forming apparatus.

FIG. 2 is a section view of a tandem color image forming apparatus having adopted an intermediate transfer body 28, which is an example of the electrophotographic color image forming apparatus. By using FIG. 2, the operation of the image forming unit 401 in the electrophotographic color image forming apparatus is explained.

The image forming unit 401 drives an exposure unit in accordance with an exposure time determined by the image processing unit 402 to form an electrostatic latent image and develops the electrostatic latent image to form a single color toner image. The image forming unit 401 forms a multicolor toner image by superimposing the single color toner images and transfers the multicolor toner image to a recording medium 11 and fixes the multicolor toner image on the recording medium 11.

A charging unit has a configuration comprising four injection chargers 23Y, 23M, 23C, and 23K for charging photoconductors 22Y, 22M, 22C, and 22K for each color of Y, M, C, and K. The injection charger 23Y comprises a sleeve 23YS, the injection charger 23M comprises a sleeve 23MS, the injection charger 23C comprises a sleeve 23CS, and the injection charger 23K comprises a sleeve 23KS. To the photoconductors 22Y, 22M, 22C, and 22K, driving forces of drive motors 40Y, 40M, 40C, and 40K are transmitted, thereby the photoconductors 22Y, 22M, 22C, and 22K rotate. The drive motors 40Y, 40M, 40C, and 40K rotate the photoconductors 22Y, 22M, 22C, and 22K in the counterclockwise direction in accordance with the image forming operation.

The exposure unit is configured so as to form an electrostatic latent image by irradiating the photoconductors 22Y, 22M, 22C, and 22K with exposure light from scanner units 24Y, 24M, 24C, and 24K to selectively expose the surfaces of the photoconductors 22Y, 22M, 22C, and 22K. Each of the scanner units 24Y, 24M, 24C, and 24K comprises multiple beams capable of irradiating a plurality of exposure lights.

The developing unit has a configuration comprising four developing machines 26Y, 26M, 26C, and 26K configured to develop each color of Y, M, C, and K in order to visualize an electrostatic latent image. The developing machine 26Y is provided with a sleeve 26YS, the developing machine 26M is provided with a sleeve 26MS, the developing machine 26C is provided with a sleeve 26CS, and the developing machine 26K is provided with a sleeve 26KS. Each developing machine 26 can be attached and detached.

The transfer unit rotates the intermediate transfer body 28 in the clockwise direction in order to transfer a single color toner image from a photoconductor 22 to the intermediate transfer body 28. Then, the transfer unit transfers the single color toner image accompanying the rotation of the photoconductors 22Y, 22M, 22C, and 22K and primary transfer rollers 27Y, 27M, 27C, and 27K located in opposition thereto. By making the rotation speed of the photoconductor 22 different from the rotation speed of the intermediate transfer body 28 as well as applying an appropriate bias voltage to a primary transfer roller 27, the transfer unit efficiently transfers the single color toner image onto the intermediate transfer body 28. This transfer is called a primary transfer.

Further, the transfer unit superimposes the single color toner images onto the intermediate transfer body 28 for each station and conveys a multicolor toner image formed by superimposition to a secondary transfer roller 29 accompanying the rotation of the intermediate transfer body 28. Furthermore, the transfer unit sandwiches and conveys the recording medium 11 from a sheet feed tray to the secondary transfer roller 29 and transfers the multicolor toner image on the intermediate transfer body 28 to the recording medium 11. The transfer unit electrostatically transfers the toner image by applying an appropriate bias voltage to the secondary transfer roller 29. This transfer is called a secondary transfer. The secondary transfer roller 29 is in contact with the recording medium 11 at a position 29a while transferring the multicolor toner image onto the recording medium 11 and moves to a position 29b after the printing processing.

In order to molten-fix the multicolor toner image transferred to the recording medium 11 to the recording medium 11, the fixing unit comprises a fixing roller 32 for heating the recording medium 11 and a pressure roller 33 for causing the recording medium 11 to come into contact with the fixing roller 32 under pressure. The fixing roller 32 and the pressure roller 33 are formed into the shape of a hollow and a heater 34 is built inside the fixing roller 32 and a heater 35 is built inside the pressure roller 33. A fixing device 31 fixes toner to the recording medium 11 by applying heat and pressure as well as conveying the recording medium 11 holding the multicolor toner image by the fixing roller 32 and the pressure roller 33.

After that, the recording medium 11 to which toner is fixed is discharged to a sheet discharge tray, not shown, by a discharge roller, not shown, and the image forming operation is completed. A cleaning unit 30 is configured to clean toner left on the intermediate transfer body 28 and the waste toner left after the multicolor toner image in four colors formed on the intermediate transfer body 28 is transferred to the recording medium 11 is stored in a cleaner vessel.

[Configuration of Image Processing Unit]

Next, by using FIG. 4A and FIG. 4B, a configuration of the image processing unit 402 in the color image forming apparatus according to the present embodiment is explained.

An image generating unit 404 generates raster image data on which printing processing can be performed from print data received from a computer device etc., not shown, and outputs it as RGB data and attribute data indicative of the data attribute of each pixel for each pixel. It may also be possible to configure the image generating unit 404 so as to handle image data read by a reading unit by providing the reading unit in the color image forming apparatus itself instead of handling image data received from a computer device etc. The reading unit referred to here includes at least a CCD (Charge Coupled Device) or CIS (Contact Image Sensor). Further, it may also be possible to design a configuration in which a processing unit configured to perform predetermined image processing on read image data is also provided. Furthermore, it may also be possible to design a configuration in which the image generating unit is not provided in the color image forming apparatus itself but image data is received form an external reading unit via an interface, not shown.

A color conversion processing unit 405 converts RGB data into CMYK data in accordance with the toner color of the image forming unit 401 and stores the CMYK data and attribute data in a bitmap memory (storage unit) 406.

The storage unit 406 is a first storage unit configured in the image processing unit 402 and temporarily stores raster image data. It may also be possible to configure the storage unit 406 by a page memory configured to store image data corresponding to one page or to configure the storage unit 406 as a band memory configured to store data corresponding to a plurality of lines. Here, the line is a set of pixels arrayed in the main scanning direction.

Halftone processing units 407C, 407M, 407Y, and 407K perform halftone processing on attribute data and data of each color output from the storage unit 406. As the specific configuration of the halftone processing unit, mention is made of a configuration related to screen processing and a configuration related to error diffusion processing. The screen processing is processing to turn data into N-valued data by using a plurality of predetermined dither matrixes and image data to be input. The error diffusion processing is processing to turn data into N-valued data by comparing input image data with a predetermined threshold value and to diffuse a difference between the input image data and the threshold value at that time to surrounding pixels to be subjected later to processing to turn data into N-valued data.

A storage unit 408 is a second storage unit configured in the image processing unit 402 and stores N-valued data processed by the halftone processing unit 407. In the case where the pixel position at which image processing is performed after the storage unit 408 is a transfer point, at the point of time of read from the storage unit 408, a transfer by an amount corresponding to one pixel is made. The transfer point described here will be described later.

Interpolation determining units 409C, 409M, 409Y, and 409K for each color determine whether the pixels before and after the transfer point of the N-valued data to be input are pixels that require interpolation in the processing in subsequent stages or pixels for which interpolation does not need to be performed as processing of the pixels.

Timing adjusting units 410C, 410M, 410Y, and 410K achieve synchronization between the N-valued data from the storage unit 408 and the determination result of an interpolation determining unit 409.

Transfer buffers 411C, 411M, 411Y, and 411K temporarily hold output data from the interpolation determining unit 409 and a timing adjusting unit 410. In the present explanation, the first storage unit 406, the second storage unit 408, and the transfer buffer 411 are explained so as to have separate configurations, but it may also be possible to configure these components by a common storage unit.

An interpolation processing unit 412 performs interpolation processing on image data that appears with a difference in level on the line of interest. By the interpolation processing of the interpolation processing unit 412, the image data that is continuous in the main scanning direction is prevented from appearing with a large difference in level.

A pulse width modulation (PWM) unit 413 performs processing to convert image data of each color output from the interpolation processing unit 412 into an exposure time of each of scanner units 414C, 414M, 414Y, and 414K. Then, the image data after the conversion is output from a printing unit 415 of the image forming unit 401.

[Profile of Scanning Line]

Figure 3:
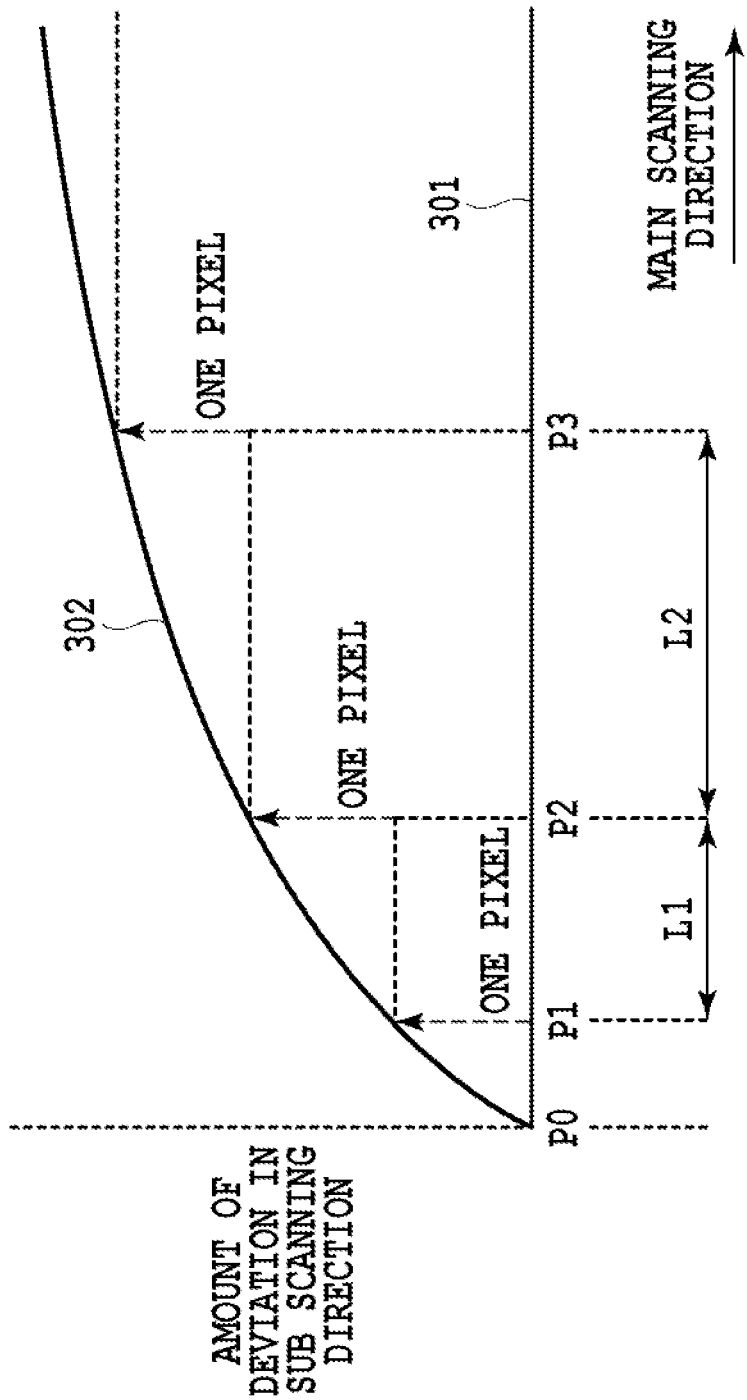
FIG. 3 is an explanatory diagram for explaining a profile of a scanning line of an image forming apparatus.

A profile of a scanning line of a beam of each color of the image forming apparatus is explained by using FIG. 3. FIG. 3 is a diagram showing a region in which the scanning line of the image forming apparatus deviates upward (in the vertical direction) with respect to the main scanning direction as a profile. A horizontal axis 301 is an ideal scanning line and indicates the characteristics in the case where scanning is performed in the main scanning direction vertical to the rotation direction of the photoconductor 22. Here, the term "profile" is defined as a deviation of the scanning line of the image forming unit 401 and it is assumed that the image processing unit 402 makes correction to cancel the profile. Of course, the definition of the profile is not limited to this.

Figure 5A:
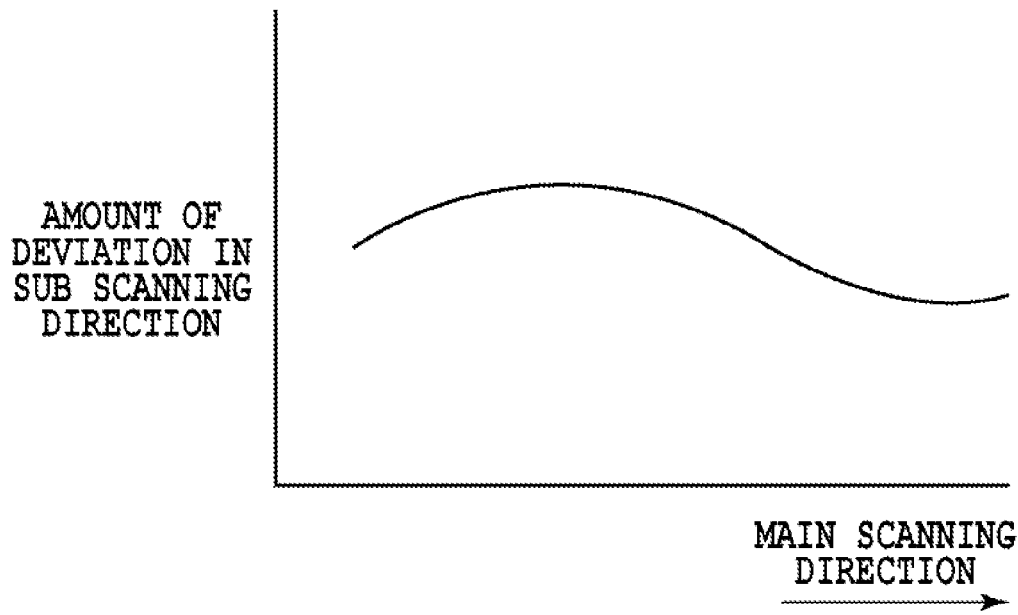
FIG. 5A and FIG. 5B are diagrams showing a correlation between a profile of a scanning line and a direction in which correction should be made.
Figure 5B:
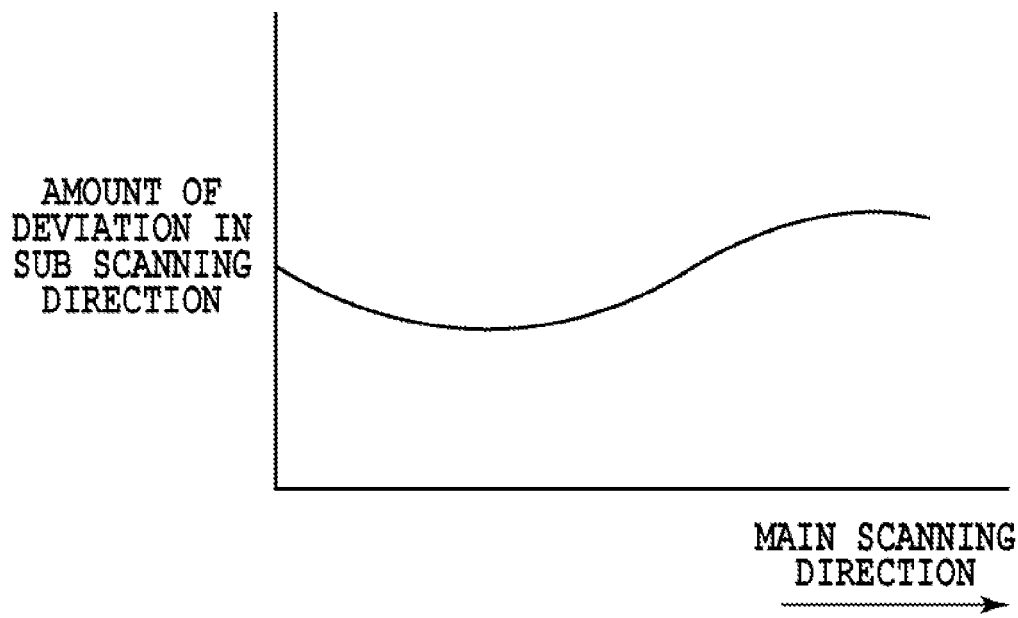

FIG. 5A and FIG. 5B are diagrams showing a correlation between the deviation direction of the scanning line profile and the direction in which correction should be made by the image processing unit 402. In the case where the profile is shown as shown in FIG. 5A, the image forming unit 401 makes a transfer in the sub scanning direction so that characteristics in the opposite direction to cancel and eliminate the profile are obtained (see FIG. 5B). Here, to make a "transfer" means to form an image by using the pixel upper or lower by one line in the sub scanning direction than a certain line in accordance with the profile of the scanning line at the time of forming an image of the line. In other words, the "transfer" processing is processing to shift a pixel included in an image in the sub scanning direction based the profile. How much the pixel is shifted in the sub scanning direction is determined based on the relationship between the position of the pixel in the main scanning direction and the position of the transfer point in the main scanning direction. More specifically, the shift amounts of the pixels before and after the transfer point vary by one pixel.

As a method for holding profile data, there is a method for holding the pixel position in the main scanning direction of the transfer point and the direction of the change of the transfer point as shown, for example, in FIG. 7A, FIG. 7B, and FIG. 7C. Hereinafter, specific explanation is given with reference to FIG. 7A, FIG. 7B, and FIG. 7C.

For the profile shown in FIG. 7A, P1, P2, P3, . . . , Pm are defined as transfer points. Each transfer point is defined, for example, as a position in the main scanning direction at which the deviation in the sub scanning direction of the scanning line from the ideal scanning line is a deviation corresponding to an integer multiple of pixel and also a position at which the deviation in the sub scanning direction between transfer points is a deviation corresponding to one pixel. The direction of the transfer point includes the case of the change in the upward direction from the previous transfer point and the case of the change in the downward direction from the previous transfer point.

For example, the transfer point P2 is a point that deviates in the upward direction from the previous transfer point P1. Consequently, the transfer direction at P2 is the upward direction (↑) as shown in FIG. 7B. Similarly, the transfer point P3 is also a point that deviates in the upward direction from the previous transfer point P2, and therefore, the transfer direction at P3 is the upward direction (↑). On the contrary, the transfer point P5 is a point that deviates in the downward direction from the previous transfer point P4, and therefore, the transfer direction at P5 is the downward direction (↓) different form the directions described hitherto.

In the case where data indicative of the upward direction is represented by "1" and data indicative of the downward direction by "0" in order to hold the data of the transfer direction at the transfer point, the data will be binary data as shown in FIG. 7C. In this case, the amount of data to be held is in proportion to the number of transfer points and in the case where the number of transfer points is m, the number of bits of the data to be held will also be m.

Returning to FIG. 3 again, explanation is given. A profile 302 of a scanning line indicates a deviation of an actual scanning line in which an inclination and a curve have occurred resulting from the positional accuracy and the deviation in the diameter of the photoconductor 22 and the positional accuracy of the optical system in the scanner unit 24 (24C, 24M, 24Y, 24K) of each color shown in FIG. 2. In the image forming apparatus, the profile is different for each recording device (recording engine) and further, in the case of the color image forming apparatus, the characteristics of the profile are different for each color. Furthermore, in the multibeam image forming apparatus, there is a case where the characteristics of the profile are different also for each beam of each color plane.

It is possible to obtain the profile as information (profile data) indicative of a curve of laser by forming a pattern image for correcting registration on the intermediate transfer belt and by reading the pattern image by a detection sensor. The profile data is obtained at the time of factory shipment and held as characteristics inherent in the image forming apparatus in a memory unit 403 of the image forming unit 401 (profiles 416C, 416M, 416Y, 416K). Of course, it is possible to obtain the profile also at the time of calibration after shipment, and therefore, the configuration may be such that the profile data can be updated after shipment. The image processing unit 402 performs processing in accordance with the profile data held by the image forming unit 401.

[Image of Electrical Correction of Registration Deviation]

Figure 11:
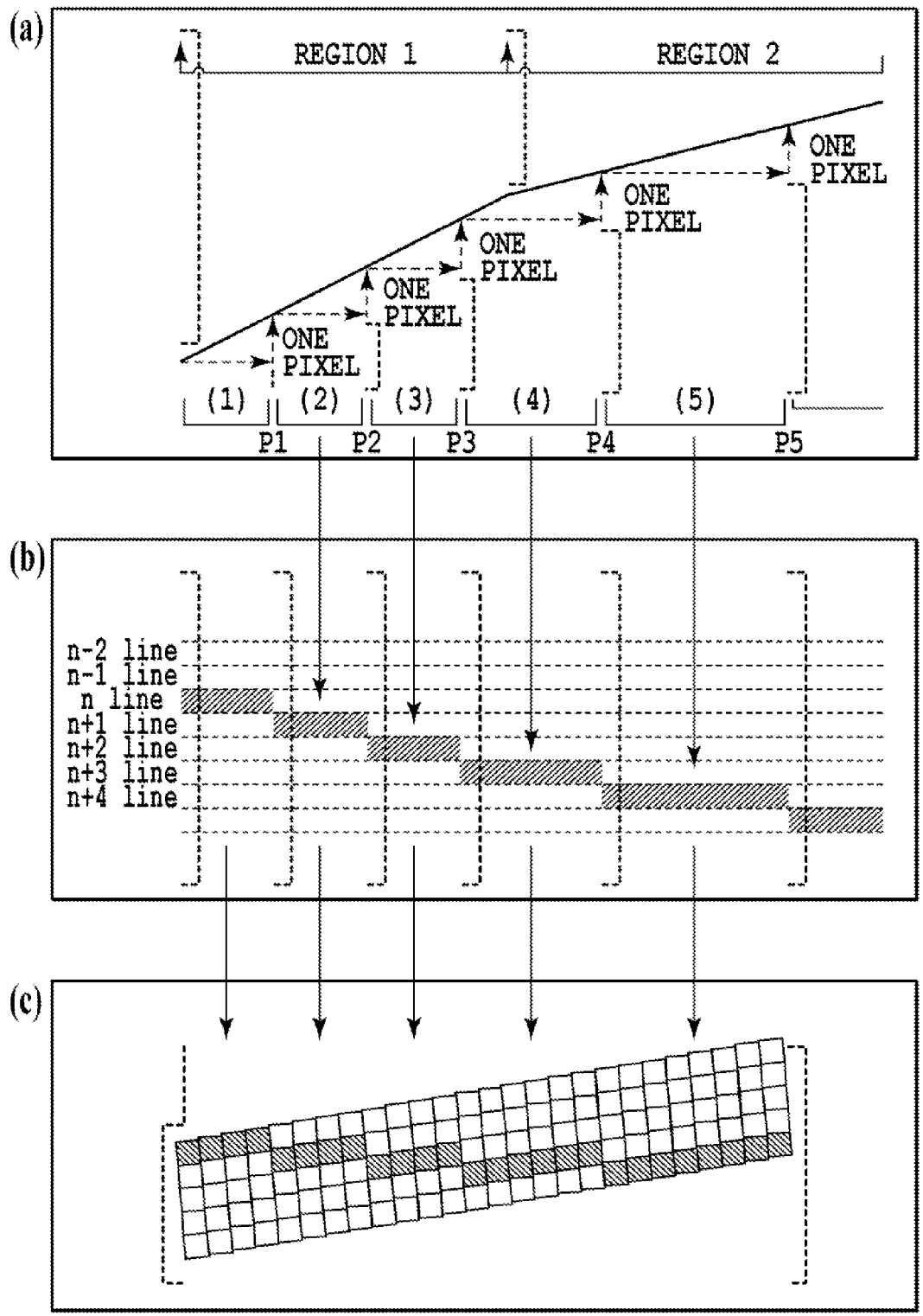
FIG. 11 is an explanatory diagram for explaining correction in units of pixels in electrical registration deviation correction.

An image of the electrical correction of registration deviation is explained by using FIG. 11. In FIG. 11, the vertical axis represents the sub scanning direction of a sheet and the horizontal axis represents the main scanning direction of a sheet. (a) in FIG. 11 shows a profile of beam irradiation curved in the opposite direction of the sub scanning with respect to the main scanning direction. In the correction in units of pixels, as shown in (b) in FIG. 11, the pixel is offset in the sub scanning direction in units of pixels in accordance with the correction amount of inclination and curve. In the subsequent description, the position at which the pixel is offset is referred to as a transfer point. Consequently, in (a) in FIG. 11, P1 to P5 correspond to the transfer points. (c) in FIG. 11 is a diagram showing an image to be scanned after the correction in which the pixel is offset in the sub scanning direction in units of pixels.

[Transfer Point]

Next, the transfer point of the present embodiment is explained in detail by using FIG. 3. The transfer point refers to a point at which the profile of the beam scanning line deviates in the sub scanning direction by one pixel. Consequently, in FIG. 3, the points that deviate by one pixel in the sub scanning direction on the profile 302, i.e., P1, P2, and P3 correspond to the transfer points. In the description in FIG. 3, it is assumed that P0 is taken to be the reference. As will be seen from FIG. 3, a length (L1, L2) between the transfer points is short in the region where the profile 302 changes abruptly and is long in the region where the change is gradual.

As described above, the transfer point closely relates to the degree of the change of the profile 302 possessed by the image forming apparatus. Consequently, in the image forming apparatus having abrupt curve characteristics, the number of transfer points is large and on the contrary, in the image forming apparatus having gradual curve characteristics, the number of transfer points is small.

As already explained, the profiles possessed by the image forming apparatus are different for each beam and for each color, and therefore, the numbers of transfer points and the positions thereof possessed by the image forming apparatus are also different for each color. This difference between colors appears as a registration deviation in the image in which all the toner images in all the colors are transferred onto the intermediate transfer body 28. The processing at the transfer point in the multibeam image forming apparatus will be described later by using another drawing.

[Transfer Processing]

Figure 6A:
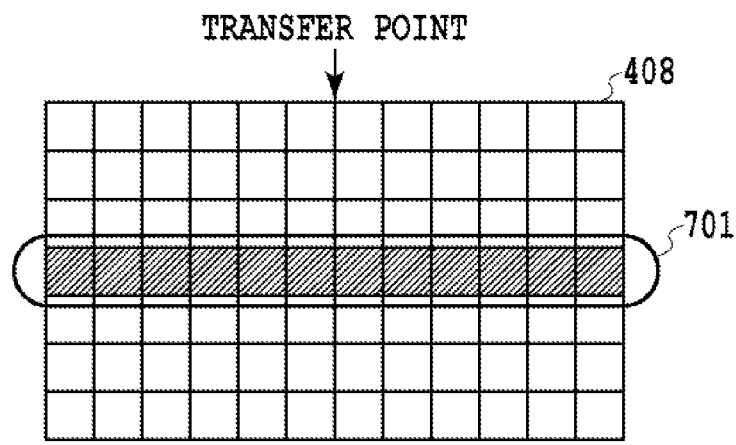
FIG. 6A to FIG. 6C are diagrams schematically showing a state of data held in a storage unit and data to be read at the time of transfer processing.
Figure 6B:
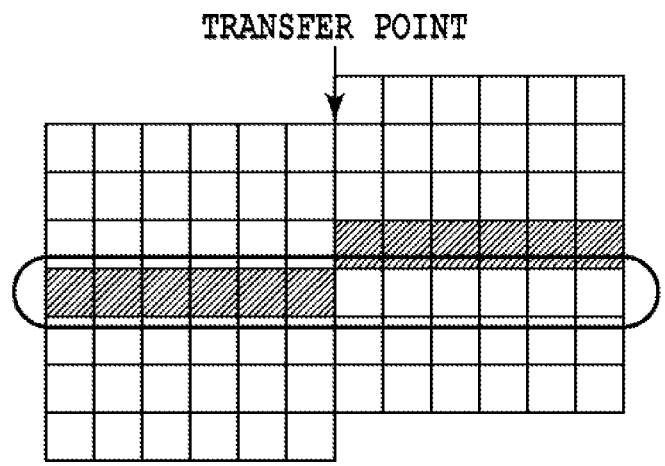
Figure 6C:
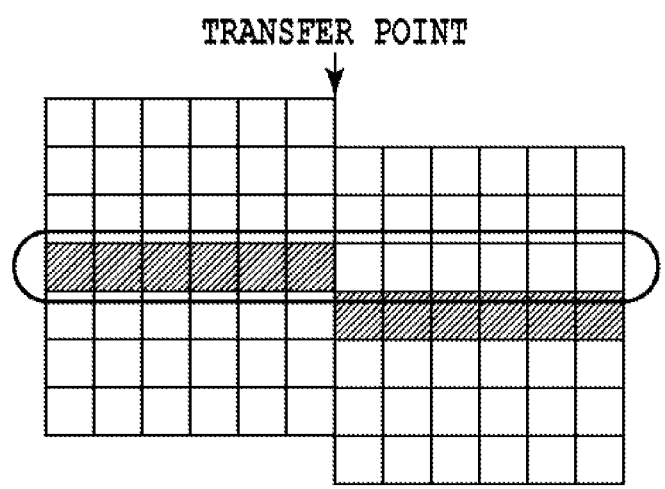

Next, by using FIG. 6A, FIG. 6B, and FIG. 6C, transfer processing is explained. FIG. 6A is a diagram schematically showing a state of data held by the storage unit 408. As shown in FIG. 6A, in the state of being stored by the storage unit 408, the data after being processed by the halftone processing unit 407 is held regardless of the correction direction by the image processing unit 402 or the profile of the image forming unit 401.

In the case where the direction in which a transfer should be made by the image processing unit 402 is the upward direction at the point of time of a line 701 in FIG. 6A being read, a state is brought about where the line 701 is deviated in the upward direction by an amount corresponding to one pixel with the transfer point as a boundary as shown in FIG. 6B. In the case where the direction in which a transfer should be made by the image processing unit 402 is the downward direction at the point of time of the line 701 in FIG. 6A being read, a state is brought about where the line 701 is deviated in the downward direction by an amount corresponding to one pixel with the transfer point as a boundary as shown in FIG. 6C. The transfer processing is defined as deviating the line of interest by an amount corresponding to one pixel with the transfer point as a boundary at the time of image data of the line being read from the storage 408 as described above.

[Transfer Processing of Multiple Beams]

Next, the profile of a beam scanning line and transfer processing in the multibeam image forming apparatus of the present embodiment are explained by using FIG. 8A to FIG. 10C. In the following, for simplification of explanation, explanation is given by using a multibeam image forming apparatus having two beams for a single color plane as an example. However, the image forming apparatus may be a multibeam image forming apparatus having N (N>2) beams for a single color plane.

Figure 8A:
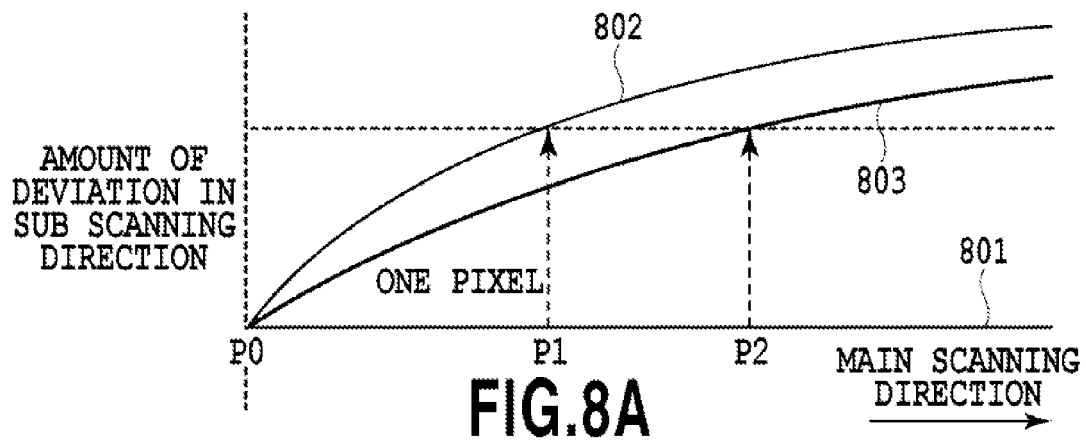
FIG. 8A to FIG. 8D are explanatory diagrams for explaining a relationship between a profile of a scanning line and electrical registration deviation correction in the multibeam image forming apparatus according to the first embodiment.

A horizontal line 801 in FIG. 8A is an ideal scanning line and shows the characteristics in the case where scanning is performed in the main scanning direction vertical to the rotation direction of the photoconductor 22. Further, FIG. 8A shows a profile 802 of a first beam scanning line and a profile 803 of a second beam scanning line in the case where two beams for a single color plane is taken to be the first beam and the second beam, respectively. FIG. 8A to FIG. 8D show the case where the beam scanning lines in the multibeam image forming apparatus deviate upward (in the vertical direction) with respect to the man scanning direction as profiles and further, the profiles of the scanning lines of the first beam and the second beam are not the same and there is a deviation therebetween. However, it should be noted that in many cases, the difference between the profiles of two beams for a single color plane is actually small and in the case where the difference is too large, the image forming apparatus cannot be used as an image forming apparatus. Specifically, it is sufficiently possible to manufacture an image forming apparatus so that the amount of deviation in the sub scanning direction at the same position in the main scanning direction between the profiles of scanning lines of two beams for a single color plane is less than one pixel. Because of this, explanation given here premises that the amount of deviation in the sub scanning direction at the same position in the main scanning direction between the profiles of scanning lines of two beams for a single color plane is less than one pixel.

As already explained, the transfer point refers to a point at which the profile of a scanning line deviates by one pixel in the sub scanning direction. In other words, in FIG. 8A, P1 that is a point that deviates by one pixel in the sub scanning direction on the profile 802 of the first beam scanning line corresponds to the transfer point of the first beam. Similarly, P2 that is a point that deviates by one pixel in the sub scanning direction on a profile 803 of the second beam scanning line corresponds to the transfer point of the second beam. In FIG. 8, description is given by taking P0 as a reference. As will be seen from FIG. 8A, because the profile of the scanning line of the first beam and that of the second beam are not the same, the points at which a deviation of one pixel takes place in the sub scanning direction in each of the beams do not agree with each other, i.e., the positions in the main scanning direction of the transfer points do not agree with each other.

Figure 8B:
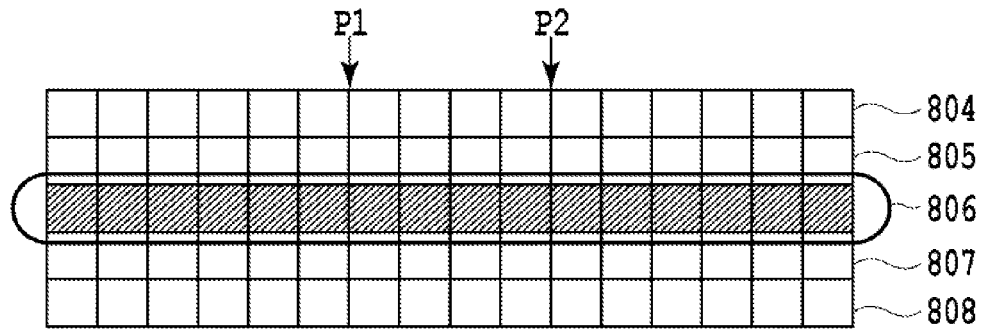

FIG. 8B is a diagram schematically showing a state of data held by the storage unit 408. As shown in FIG. 8B, in the state of being held by the storage unit 408, the data after being processed by the halftone processing unit 407 is held regardless of the profile 416 of the beam scanning line held by the image forming unit 401. Here, the image forming apparatus having two beams for each color plane is supposed, and therefore, the first beam is used for exposure of odd-numbered lines 804, 806, and 808 and the second beam is used for exposure of even-numbered lines 805 and 807. Further, for simplification of explanation, explanation is given by using an image in which only the third line 806 in FIG. 8B is black and other pixels are white as an example.

Figure 8C:
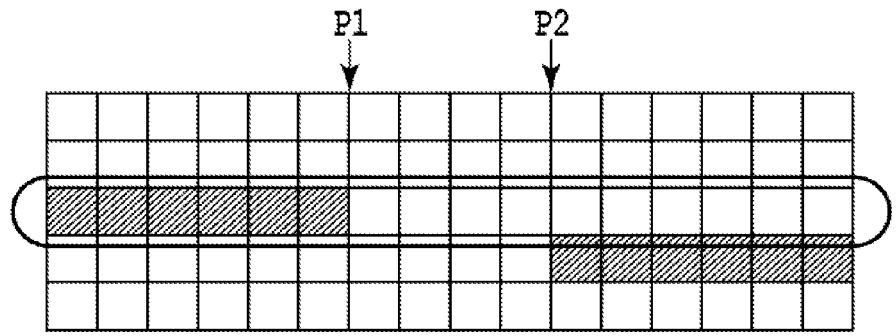

In the case where the direction in which a transfer should be made in the image processing unit 402 is the upward direction at the point of time of the line 806 in FIG. 8B being read, the line is deviated by an amount corresponding to one pixel in the upward direction with the transfer point as a boundary. However, in the multibeam image forming apparatus shown in FIG. 8, the profiles of the two beam scanning lines in each color plane are not the same and there is a deviation therebetween, and therefore, the position in the main scanning direction of the transfer point of the first beam and that of the second beam deviate form each other. Consequently, in the case where image transfer processing is performed at the transfer points of the first beam and the second beam, respectively, an image such as shown in FIG. 8C is read and the black line is cut between the transfer point P1 of the first beam and the transfer point P2 of the second beam. As described above, in the case where profiles of two beams for a single color plane deviate from each other in the multibeam image forming apparatus and in the case where transfer processing is performed by using the transfer point of a single beam, there is a possibility that the transfer processing cannot be performed appropriately.

[Correction of Transfer Point]

In order to solve the above-described problem, in the multibeam image forming apparatus of the present embodiment, the transfer point is corrected.

As described above, in FIG. 8A, the transfer point P1 of the first beam and the transfer point P2 of the second beam do not agree with each other and the positions in the main scanning direction of the transfer points, which would make a pair at the same position in the case where the two beam profiles within each color plane are the same, deviate from each other. As described above, in the case where the positions in the main scanning direction of the transfer points that make a pair within a single color plane are different, correction to cause the positions in the main scanning direction of the transfer points that make a pair to agree with each other is made.

Figure 8D:
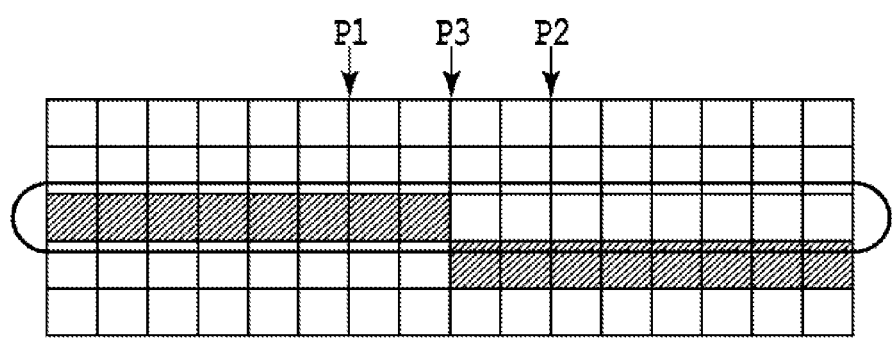

Specifically, in FIG. 8A, the middle point between the positions of P1 and P2 in the main scanning direction is calculated and the position of the middle point in the main scanning direction is defined as a common transfer point P3 of the first beam and the second beam. FIG. 8D is a diagram showing an image in the case where the transfer processing of the image is performed by using the common transfer point P3. By making a transfer in the image at the position of P3 for both the first beam and the second beam, it is possible to prevent missing of the image between P1 and P2 at the point of time of transfer processing. Here, there is such a problem that which transfer points of the transfer points of the two beams within a single color plane should be considered as a pair in the case where the positions in the main scanning direction are compared. Consequently, next, a method for specifying transfer points that make a pair in the multibeam image forming apparatus is explained.

[Transfer Points that Make a Pair in Multibeam Image Forming Apparatus]

Because the beam profiles are different depending on the recording device (recording engine), it is necessary to specify a pair of transfer points that should agree with each other in the case where the profiles are the same from the transfer points of the first beam and the second beam. By using FIG. 9A and FIG. 9B, a method for specifying transfer points that make a pair is explained.

FIG. 9A is a diagram showing an example of profiles of the multibeam image forming apparatus. A horizontal axis 901 is an ideal scanning line, showing the characteristics in the case where scanning is performed in the main scanning direction vertical to the rotation direction of the photoconductor 22. A broken line 906 represents a scanning line in the case where the scanning line deviates by one pixel in the sub scanning direction from the ideal scanning line. Similarly, a broken line 905 represents a scanning line in the case where the scanning line deviates by two pixels in the sub scanning direction and a broken line 904 represents a scanning line in the case where the scanning line deviated by three pixels in the sub scanning direction. A profile 902 indicates the profile of the first beam and a profile 903 indicates the profile of the second beam. Further, in FIG. 9A, the X coordinate at the left end in the main scanning direction is defined as P1 and the X coordinate at the right end in the main scanning direction as Pr.

For the profiles shown in FIG. 9A, the transfer points of the first beam are defined as Po1, Po2, Po3, Po4, Po5, and Po6 and the transfer points of the second beam as Pe1, Pe2, Pe3, and Pe4. As the direction of the transfer point, there are a case where the change is in the upward direction and a case where the change is in the downward direction.

Here, in order to specify the transfer points that make a pair, the transfer points of the first beam and the second beam are arranged in the direction from the left end P1 in the main scanning direction to the right end Pr in the main scanning direction. At this time, the transfer points are arranged in order from the transfer point whose value of the X coordinate is closest to P1, regardless of the first beam or the second beam (see FIG. 9B). As the result of arranging the transfer points as described above for the profiles illustrated in FIG. 9A, the transfer points are held as shown in FIG. 9B.

As described previously, the present explanation premises that the amount of deviation in the sub scanning direction at the same position in the same main scanning direction between the profiles of the two beam scanning lines for a single color plane is less than one pixel. In other words, the amount of deviation in the sub scanning direction between the profiles of the two beam scanning lines within a single color plane never becomes one pixel or more. Because of this, there are considered two cases as below for the movement of the transfer points of the two beams within a single color plane.

The first case is a case where the profiles are viewed in order from the side of the smallest value of the X coordinate in the main scanning direction, and there is a transfer point at which a transfer is made in the upward direction or in the downward direction on one of the two beams, and then a transfer is made in the same direction on the other beam. In the example shown in FIG. 9B, the relationship between Po1 and Pe1 and the relationship between Po2 and Pe2 correspond to the first case, and therefore, it is possible to regard Po1 and Pe1, and Po2 and Pe2 as a pair, respectively.

The second case is a case where profiles are viewed in order from the side of the smallest value of the X coordinate in the main scanning direction, and there is a transfer point at which a transfer is made in the upward direction or in the downward direction on one of the two beams, and then a transfer is made in the downward direction or in the upward direction on the same beam. In this case, there exists no transfer point of the other beam between the transfer points of the same beam. Because the amount of deviation in the sub scanning direction at the same position in the main scanning direction between the profiles of the two beam scanning lines for a single color plane is less than one pixel, in the second case, in a case where there is a transfer point first in the upward direction, the next transfer point should be in the downward direction. In the example shown in FIG. 9B, the relationship between Po3 and Po4 corresponds to the second case.

As the relationship between Po3 and Po4, in the case where there exist successive transfer points of one of the beams at the time of successively making a pair of transfer points in order from the left end P1, these transfer points are not counted as a pair and transfer points that will make a pair are searched for from the next transfer point. In other words, in the case of the profiles shown in FIG. 9A, the transfer points indicated by Po1 and Pe1 make a pair and similarly, Po2 and Pe2, Pe3 and Po5, and Pe4 and Po6 are the transfer points that make a pair, respectively. On the other hand, Po3 and Po4 are not counted as the transfer points that make a pair.

As explained above, in the present embodiment, it is possible to specify transfer points that make a pair, which should agree with each other in the case where the profiles of the two beams within a single color plane are the same.

Figure 10A:
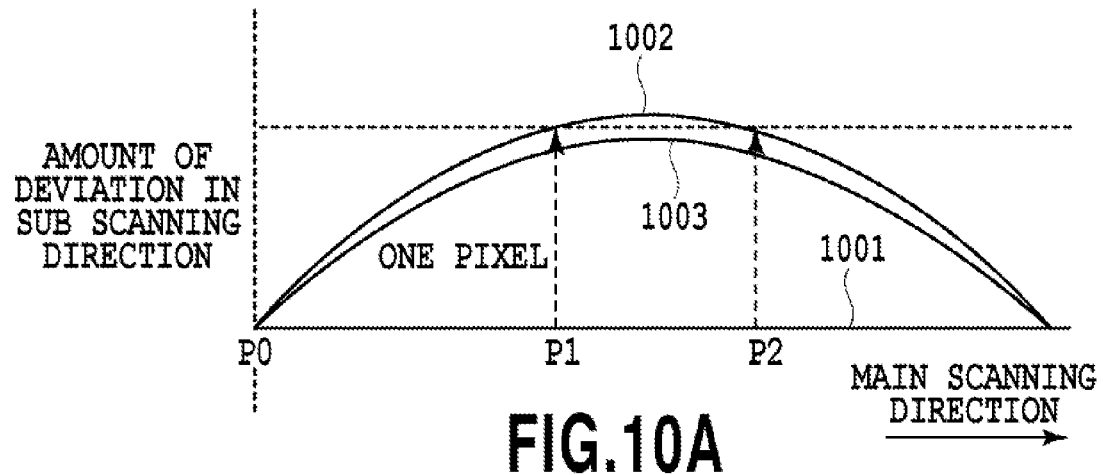
FIG. 10A to FIG. 10C are explanatory diagrams for explaining the profile of a scanning line of the multibeam image forming apparatus according to the first embodiment.
Figure 10B:
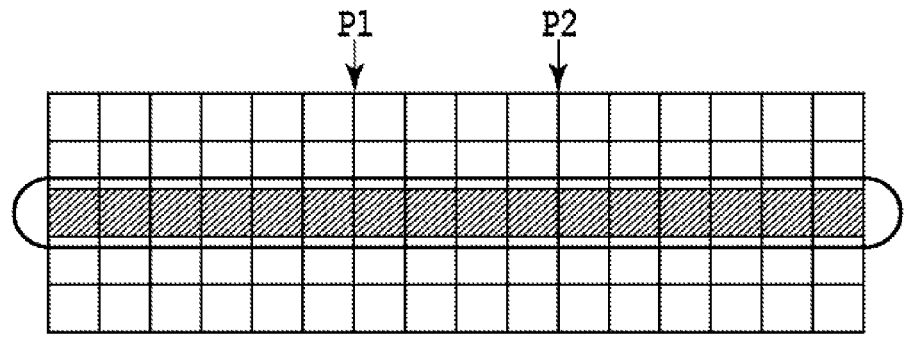

The reason that Po3 and Po4 are not counted as a pair described previously is explained below by using FIG. 10A to FIG. 10C. As FIG. 8A shows, FIG. 10A shows the case where the beam scanning lines in the multibeam image forming apparatus deviate upward (in the vertical direction) with respect to the main scanning direction as profiles and further, the profiles of the first beam scanning line and the second beam scanning line are not the same and there is a deviation therebetween. However, FIG. 10A shows the case where the profiles of the two beams are different from those in FIG. 8A. In FIG. 10A, a horizontal axis 1001 is an ideal scanning line and shows the characteristics in the case where scanning is performed in the main scanning direction vertical to the rotation direction of the photoconductor 22. FIG. 10A also shows a profile 1002 of the scanning line of the first beam and a profile 1003 of the scanning line of the second beam for a single color plane. FIG. 10B is a diagram schematically showing a state of data held by the storage unit 408. As shown in FIG. 10B, in the state of being held by the storage unit 408, the data after being processed by the halftone processing unit 407 is held regardless of the profile 416 of the beam scanning line held by the image forming unit 401.

Figure 10C:
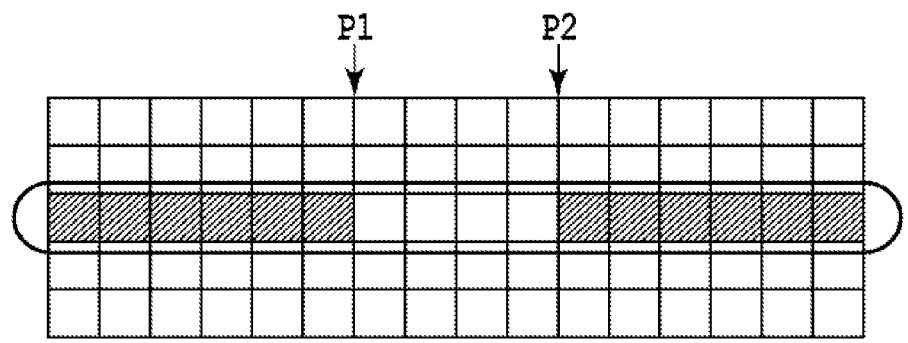

As shown in FIG. 10A, in the case where transfer points are viewed in the main scanning direction from a reference position P0, there is a transfer point P1 (first position) at which the first beam deviates upward by one pixel in the sub scanning direction. Then, before a transfer point of the second beam appears, there is a transfer point P2 (second position) at which the first beam deviates downward by one pixel in the sub scanning direction. In the case such as this, the transfer processing performed by using the transfer points of each beam alone will result in such an image as shown in FIG. 10C and there is a case where the black line is cut between P1 and P2. As described above, in the case where the first beam deviates upward by one pixel in the sub scanning direction and before the second beam deviates by one pixel in the sub scanning direction, there exists a transfer point at which the first beam deviates downward by one pixel in the sub scanning direction, the transfer processing is not performed. Due to this, it is possible to prevent the black line from being cut.

[Transfer Processing Flow of Multibeam Image Forming Apparatus]

Figure 1:
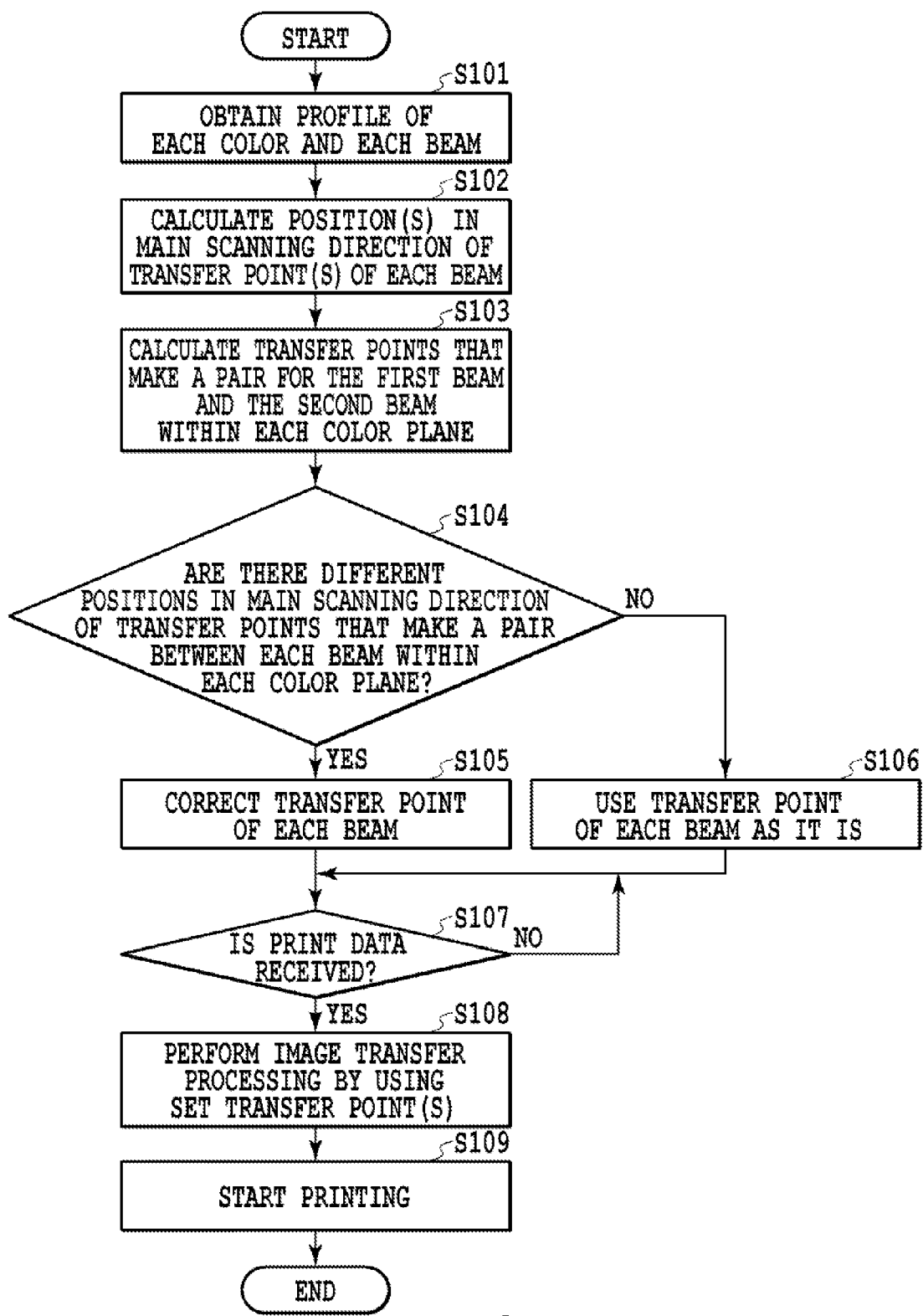
FIG. 1 is a flowchart showing a flow of a printing operation including image transfer processing in a multibeam image forming apparatus according to a first embodiment.

Next, a flow of image printing including the transfer processing in the multibeam image forming apparatus according to the present embodiment described hitherto is explained in detail in accordance with the flowchart in FIG. 1. The processing at each step of the flowchart shown in FIG. 1 is implemented by a CPU, not shown, of the multibeam image forming apparatus executing processing programs stored in the HDD.

For simplification of explanation, explanation is given by using a multibeam image forming apparatus having two beams for each color plane as a multibeam configuration as an example. However, the image forming apparatus may be a multibeam image forming apparatus having N (N>2) beams for a single color plane.

First, at step S101, the profile of each beam is obtained. Specifically, as explained already, a pattern image for registration correction is formed on the intermediate transfer belt and by reading the pattern image by the detection sensor, the profile for each beam is obtained and held in the memory unit 403.

Next, at step 102, based on the profile obtained at step S101, the position (s) in the main scanning direction of the transfer point (s) of each of the first beam and the second beam for each color plane is (are) calculated.

Next, at step S103, transfer points that make a pair are calculated for the first beam and the second beam within each color plane. The way of thinking of transfer points that make a pair is as described previously (see the section of [Transfer points that make a pair in multibeam image forming apparatus]).

Next, at step S104, by comparing the positions in the main scanning direction of the transfer points that make a pair of the first beam and the second beam of each color plane calculated at step S103, whether there are different positions in the main scanning direction of the transfer points that make a pair is determined. In the case where there are different positions in the main scanning direction of the transfer points that make a pair at step S104, the processing proceeds to step S105 and in the case where all the positions in the main scanning direction of the transfer points that make pairs are the same, the processing proceeds to step S106. Here, whether the positions in the main scanning direction of the transfer points that make a pair are the same is determined, but it may also possible to determine whether the amount of deviation between the positions in the main scanning direction of the transfer points that make a pair exceeds a certain threshold value A.

At step S105, the transfer points that make a pair, the positions of which in the main scanning direction are different, are corrected for the first beam and the second beam within each color plane. Specifically, the transfer points that make a pair, the positions of which in the main scanning direction are different, are selected for the first beam and the second beam. Then, a point that exists between the positions in the main scanning direction of the selected transfer points that make a pair is set as a common transfer point of the first beam and the second beam. This corresponds to that, for example, the point P3 that exists between the two transfer points P1 and P2 shown in FIG. 8D is set as a common transfer point. Next, the processing proceeds to step S107.

At step S106, the transfer points calculated at step S102 are set as they are as the transfer points of the first beam and the second beam. Next, the processing proceeds to step S107. The processing up to this processing (i.e., processing at steps S101 to S106) is the processing performed at the time of factory shipment or at the time of calibration.

At step S107, the multibeam image forming apparatus stands by to receive print data. In the case where print data is received at step S107, the processing proceeds to step S108.

At step S108, the transfer processing of the image is performed by using the transfer point(s) set at step S105 or S106. Specifically, in the case where the data after being processed by the halftone processing unit 407 stored by the storage unit 408 is read for printing, the line one pixel upper or lower is read in accordance with the profile with the transfer point as a boundary.

Next, at step S109, beam irradiation is performed based on the image data read at step S108 and instructed printing is performed.

As explained above, according to the multibeam image forming apparatus according to the present embodiment, even in the case where the profiles of beams within each color plane are different, it is made possible to form an image by appropriately taking the transfer point into consideration. Due to this, it is possible to prevent a deterioration in an image, such as cutting of a line, which may occur in the case where the transfer point of each beam alone is used.

Second Embodiment

In the first embodiment, the case where the image processing including the transfer processing is performed in the image forming apparatus is explained, but it is also possible to perform the processing in a host base image forming apparatus.

In the present embodiment, an embodiment in the host base image forming apparatus is explained. The host base image forming apparatus referred to here is an image forming apparatus in which a host computer connected to the image forming apparatus generates and transfers bitmap data as print data and the transferred bitmap data is printed. The host computer according to the present embodiment functions as an image processing apparatus. Upon receipt of bitmap data transferred from the host computer, the image forming apparatus according to the present embodiment stores the bitmap data in a RAM of the image forming apparatus and outputs the bitmap data from the RAM to a printer engine comprised by the image forming apparatus as a video signal. Thus, in the present embodiment, the host computer performs bitmap development (rendering), and therefore, it is not necessary to mount a high-performance CPU in the image forming apparatus and it is possible to provide a printing system at a low cost.

Figure 12:
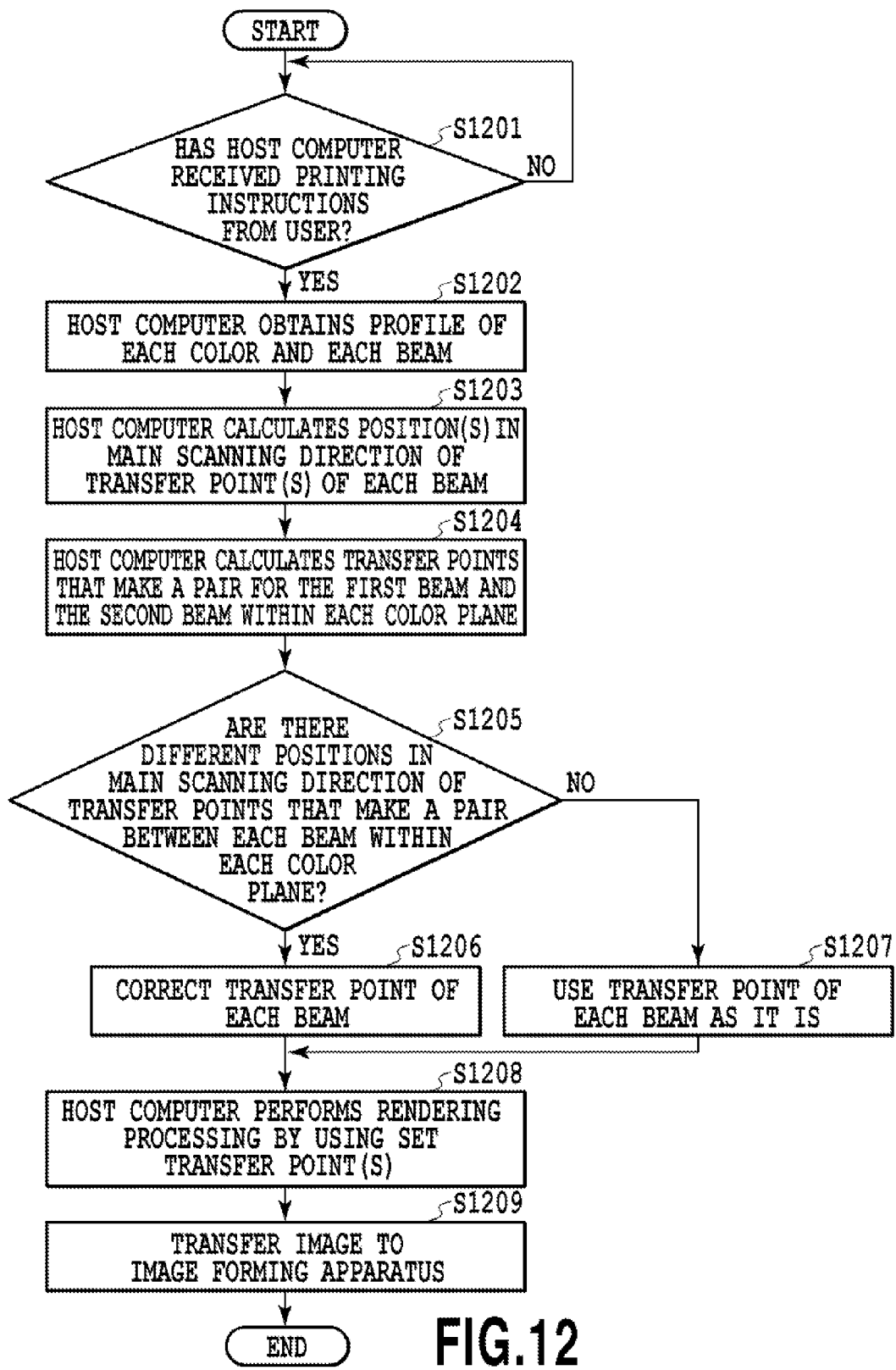
FIG. 12 is a flowchart showing a flow of a printing operation including image transfer processing in a multibeam host base image forming apparatus according to a second embodiment.

FIG. 12 is a flowchart in the case where printing is performed in the host base image forming apparatus. A flow of image printing including transfer processing in a host base multibeam image forming apparatus is explained in detail in accordance with the flowchart in FIG. 12.

The processing at each step of the flowchart shown in FIG. 12 is implemented by a CPU, not shown, of the host computer executing a processing program. The processing program is stored in an HDD, not shown, of the host computer. For simplification of explanation, explanation is given by using a host base multibeam image forming apparatus having two beams for each color plane as a multibeam configuration as an example. However, the image forming apparatus may be a multibeam image forming apparatus having N (N>2) beams for a single color plane.

First, at step S1201, the host computer waits for printing instructions from a user. In the case where printing instructions from a user are received, the processing proceeds to step S1202.

At step S1202, the host computer obtains the profile of each beam of the image forming apparatus. Specifically, the host computer obtains the profile for each beam held in a memory by the image forming apparatus from the image forming apparatus. It is possible to obtain the profile for each beam as profile information by the image forming apparatus forming a pattern image for registration correction on an intermediate transfer belt and reading the pattern image by a detection sensor, and the profile is held in the memory of the image forming apparatus. Detection of the profile information of the beam used here is processing performed at the time of factory shipment or at the time of calibration.

Next, at step S1203, based on the profile obtained at step S1202, the host computer calculates the position (s) in the main scanning direction of the transfer point (s) of each of the first beam and the second beam for each color plane.

Next, at step S1204, the host computer calculates the transfer points that make a pair for the first beam and the second beam within each color plane. The way of thinking of the transfer points that make a pair is as described previously (see the section of [Transfer points that make a pair in multibeam image forming apparatus]).

Next, at step S1205, by comparing the positions in the main scanning direction of transfer points that make a pair of the first beam and the second beam of each color plane calculated at step S1204, whether there are different positions in the main scanning direction of transfer points that make a pair is determined. In the case where there are different positions in the main scanning direction of transfer points that make a pair at step S1205, the processing proceeds to step S1206 and in the case where all the positions in the main scanning direction of transfer points that make pairs are the same, the processing proceeds to step S1207. Here, whether the positions in the main scanning direction of transfer points that make a pair are the same is determined, but it may also be possible to determine whether the amount of deviation between the positions in the main scanning direction of the transfer points that make a pair exceeds the threshold value A. In other words, in the case where the amount of deviation exceeds the threshold value A, the processing may proceed to step S1206 and in the case where the amount of deviation does not exceed the threshold value A, the processing may proceed to step S1207.

At step S1206, the transfer points that make a pair, the positions of which in the main scanning direction are different, are corrected for the first beam and the second beam within each color plane. Specifically, the transfer points that make a pair, the positions of which in the main scanning direction are different, are selected for the first beam and the second beam. Then, a point that exists between the positions in the main scanning direction of the selected transfer points that make a pair is set as a common transfer point of the first beam and the second beam. Next, the processing proceeds to step S1208.

At step S1207, the transfer points calculated at step S1203 are set as they are as the transfer points of the first beam and the second beam. Next, the processing proceeds to step S1208.

At step S1208, the host computer performs rendering processing by using the transfer point (s) set at step S1206 or S1207.

Next, at step S1209, the image data in which a transfer is made at step 1208 is transmitted to the image forming apparatus. The image forming apparatus performs printing in accordance with the received bitmap data.

Third Embodiment

Next, an embodiment in a half-speed mode in the image forming apparatus is explained.

The image forming apparatus in recent years has a configuration capable of printing for various media and is configured so as to be capable of switching process speeds in order to improve fixing properties for each medium. For example, there is a mode in which a process speed slower than the normal process speed is used in order to output an image of quality in the case where printing is performed on thick paper whose fixing properties are lower than those of thin paper, coated paper or an OHP sheet, which is a special sheet. Here, in the present specification, the mode in which a process speed half the normal process speed is used is defined as a half-speed mode. On the contrary, the mode in which a process speed, which is the normal speed at the time of such as printing on plain paper, is used is defined as a normal speed mode. At the time of the half-speed mode, the photoconductors 22Y, 22M, 22C, and 22K, and the intermediate transfer belt operate at a speed half the normal speed. Further, the speed of the fixing roller 32 is also halved, and thereby, the fixing properties are improved. However, the scanning speed of laser scanning is not changed. At the time of the half-speed mode, by outputting only the beam for odd-numbered lines so as not to output even-numbered lines, it is possible to form a normal image by one of the beams.

Figures 13A, 13B:
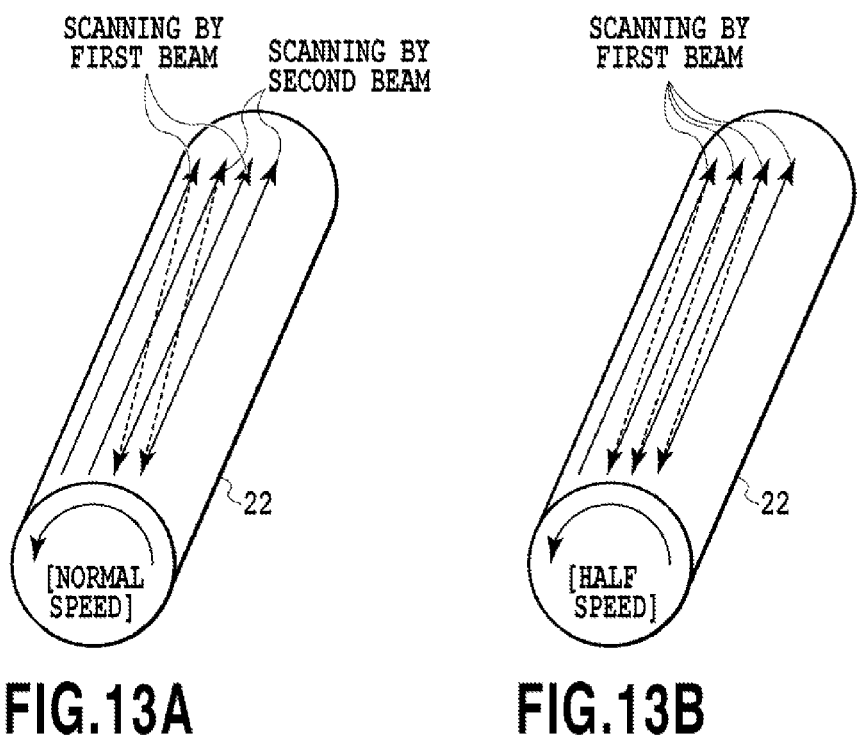
FIG. 13A is an explanatory diagram related to beam scanning at the time of a normal speed mode in a multibeam image forming apparatus according to a third embodiment.
FIG. 13B is an explanatory diagram related to beam scanning at the time of a half-speed mode in the multibeam image forming apparatus according to the third embodiment.

Here, beam irradiation at the time of the normal speed mode and at the time of the half-speed mode in the multibeam image forming apparatus is explained by using FIG. 13A and FIG. 13B.

FIG. 13A is a diagram for explaining beam irradiation at the time of the normal speed mode. Exposure of odd-numbered lines is performed by the first beam and exposure of even-numbered lines is performed by the second beam. In this case, as described above, transfer point correction is made by using the transfer points that make a pair of the first beam and the second beam.

FIG. 13B is a diagram for explaining beam irradiation at the time of the half-speed mode. As described above, at the time of the half-speed mode, the photoconductors 22Y, 22M, 22C, and 22K, and the intermediate transfer belt operate at a speed half the normal speed. However, the beam scanning speed is not changed, and therefore, it is made possible to expose the normal image by one beam also in the image forming apparatus having multiple beams. Because of this, at the time of the half-speed mode, printing is performed by using only one beam.

As described above, in the transfer processing at the time of the half-speed mode in which only the first beam is used, only the transfer point of the first beam is used instead of using the transfer points that make a pair of the first beam and the second beam. In other words, the transfer processing is performed by using the transfer point obtained from the profile of the scanning line of the first beam.

Due to this, it is made possible to perform the transfer processing without a deterioration in an image also at the time of the half-speed mode.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-168908, filed Aug. 15, 2013, which is hereby incorporated by reference herein in its entirety.

What is claimed is:

1. An image processing apparatus for processing image data of a single color plane to be transmitted to an image forming unit configured to form an image of the single color plane by a first beam and a second beam, the apparatus comprising:

an obtaining unit configured to obtain first information to be used for correcting a deviation in an image in a sub scanning direction due to a curve of a scanning line of the first beam and second information to be used for correcting a deviation in an image in the sub scanning direction due to a curve of a scanning line of the second beam;

a setting unit configured to obtain a position in a main scanning direction for the first beam based on the obtained first information and a position in the main scanning direction for the second beam based on the obtained second information, and set, based on the obtained position for the first beam and the obtained position for the second beam, a common position in the main scanning direction, that exists in the middle between the obtained position for the first beam and the obtain position for the second beam, for the image data of the single color plane for each of the first beam and the second beam; and a correcting unit configured to shift, at the set common position in the main scanning direction, pixels included in the image data of the single color plane for each of the first beam and the second beam in the sub scanning direction.

2. The image processing apparatus according to claim 1, further comprising a determining unit configured to determine whether there is a position in the main scanning direction for the second beam at which a pixel is shifted between a first position and a second position in the main scanning direction for the first beam at which a pixel is shifted in the sub scanning direction, wherein in a case where the determining unit determines that there is not a position in the main scanning direction for the second beam at which a pixel is shifted between the first position and the second position in the main scanning direction for the first beam at which a pixel is shifted in the sub scanning direction, the setting unit does not set the common position for the first beam and the second beam between the first position and the second position.

3. The image processing apparatus according to claim 1, wherein the setting unit does not set the common position in a case where an image of a page is formed by using the first beam without using the second beam, and the shift in the sub scanning direction of pixels included in the image for the first beam is made based on the position in the main scanning direction obtained based on the obtained first information.

4. The image processing apparatus according to claim 3, wherein in a case where an image of a page is formed by using the first beam without using the second beam, a speed at which a recording medium on which the image is formed is conveyed is slower than that in a case where the image of the page is formed by using the first beam and the second beam.

5. An image processing method for processing image data of a single color plane to be transmitted to an image forming unit configured to form an image of the single color plane by a first beam and a second beam, the method comprising:

an obtaining step of obtaining first information to be used to correct a deviation in an image in a sub scanning direction due to a curve of a scanning line of the first beam and second information to be used to correct a deviation in an image in the sub scanning direction due to a curve of a scanning line of the second beam;

a setting step of obtaining a position in a main scanning direction for the first beam based on the obtained first information and a position in the main scanning direction for the second beam based on the obtained second information, and setting, based on the obtained position for the first beam and the obtained position for the second beam, a common position in the main scanning direction, that exists in the middle between the obtained position for the first beam and the obtained position for the second beam, for the image data of the single color plane for each of the first beam and the second beam; and a correcting step of shifting, at the set common position in the main scanning direction, pixels included in the image data of the single color plane for each of the first beam and the second beam in the sub scanning direction.

6. A non-transitory computer readable storage medium storing a program for causing a computer to execute an image processing method, the method comprising:

an obtaining step of obtaining first information to be used to correct a deviation in an image in a sub scanning direction due to a curve of a scanning line of a first beam for forming an image of a single color plane and second information to be used to correct a deviation in an image in the sub scanning direction due to a curve of a scanning line of a second beam for forming an image of the single color plane;

a setting step of obtaining a position in a main scanning direction for the first beam based on the obtained first information and a position in the main scanning direction for the second beam based on the obtained second information, and setting, based on the obtained position for the first beam and the obtained position for the second beam, a common position in the main scanning direction, that exists in the middle between the obtained position for the first beam and the obtained position for the second beam, for the image data of the single color plane for each of the first beam and the second beam;

a correcting step of shifting, at the set common position in the main scanning direction, pixels included in the image data of the single color plane for each of the first beam and the second beam in the sub scanning direction; and a transmitting step of transmitting the image data of the single color plane in which the shift is made to an image forming unit configured to form the image of the single color plane by the first beam and the second beam.

* * * * *